United States Patent [19]
Yoshinaga et al.

[11] Patent Number: 5,598,574
[45] Date of Patent: Jan. 28, 1997

[54] VECTOR PROCESSING DEVICE

[75] Inventors: Toru Yoshinaga; Naoki Shinjo, both of Kawasaki, Japan

[73] Assignee: Fujitsu Limited, Kawasaki, Japan

[21] Appl. No.: 617,148

[22] Filed: Mar. 18, 1996

Related U.S. Application Data

[63] Continuation of Ser. No. 115,321, Sep. 2, 1993, abandoned.

[30] Foreign Application Priority Data

Nov. 30, 1992  [JP]  Japan ................................. 4-320593

[51] Int. Cl.⁶ .......................................................... G06F 9/00
[52] U.S. Cl. ........................... 395/800; 395/870; 395/742; 364/232.21; 364/263.2; 364/231.8; 364/DIG. 1
[58] Field of Search ........................................ 395/800, 375, 395/733, 735, 742, 856, 870, 438

[56] References Cited

U.S. PATENT DOCUMENTS

| | | | |
|---|---|---|---|
| 4,722,046 | 1/1988 | Kasrazadeh et al. | 364/200 |
| 4,782,441 | 12/1988 | Inagami et al. | 364/200 |
| 4,789,925 | 12/1988 | Lahti | 364/200 |
| 4,827,407 | 5/1989 | Nakatani | 364/200 |
| 4,839,801 | 6/1989 | Nicely et al. | 364/200 |
| 4,873,630 | 10/1989 | Rusterholz et al. | 364/200 |
| 4,881,168 | 11/1989 | Inagami et al. | 364/200 |
| 4,888,679 | 12/1989 | Fossum et al. | 364/200 |
| 4,974,198 | 11/1990 | Ishii | 364/900 |
| 5,001,626 | 3/1991 | Kashiyama et al. | 364/200 |
| 5,010,477 | 4/1991 | Omoda et al. | 364/200 |
| 5,060,148 | 10/1991 | Isobe et al. | 395/800 |
| 5,123,095 | 6/1992 | Papadopoulos et al. | 395/375 |
| 5,146,599 | 9/1992 | Kajima et al. | 395/800 |
| 5,179,530 | 1/1993 | Genusov et al. | 364/726 |
| 5,179,674 | 1/1993 | Williams et al. | 395/400 |
| 5,193,167 | 3/1993 | Sites et al. | 395/425 |
| 5,197,130 | 3/1993 | Chen et al. | 395/325 |
| 5,261,063 | 11/1993 | Kohn et al. | 395/375 |
| 5,481,746 | 1/1996 | Schiffleger et al. | 395/800 |
| 5,511,210 | 11/1996 | Nishikawa et al. | 395/800 |

FOREIGN PATENT DOCUMENTS 0208870   1/1987   European Pat. Off. .

OTHER PUBLICATIONS

Anonymous, "Early Hold that Allows Reads on Other Cards to Continue" Research Disclosure, No. 301, May 1989, p. 295 (XP 000052455).

*Primary Examiner*—Alpesh M. Shah
*Attorney, Agent, or Firm*—Staas & Halsey

[57]  ABSTRACT

A vector processing device includes a vector unit having operation pipelines and a vector register connected to the operation pipelines, a memory unit to be operated by the operation pipelines and results of operations obtained from the operation pipelines, and a memory control unit having a data buffer provided between the vector register and the memory unit. The vector processing device also includes data buffer valid counter counting the number of pieces of data read from the vector register and sent to the data buffer, and pipeline stop predictor selectively interrupting outputting an access request from the vector unit to the memory unit on the basis of the number of pieces of data counted by the data buffer valid counter when the operation pipelines are chained via the vector register.

4 Claims, 12 Drawing Sheets

FIG. 13

PRIOR ART (1)
LOAD

I {
(A) {
  START
  ADDRESS GENERATION
  ADDRESS TRANSLATION
  REQUEST
  PRIORITY
  MSU
  BUFFER WRITE
  REGISTER WRITE
}

STORE (B) {
  START
  ADDRESS GENERATION
  ADDRESS TRANSLATION
  REQUEST
  PRIORITY
  REGISTER READ
  BUFFER READ
  MSU
}

VE-STOP
}

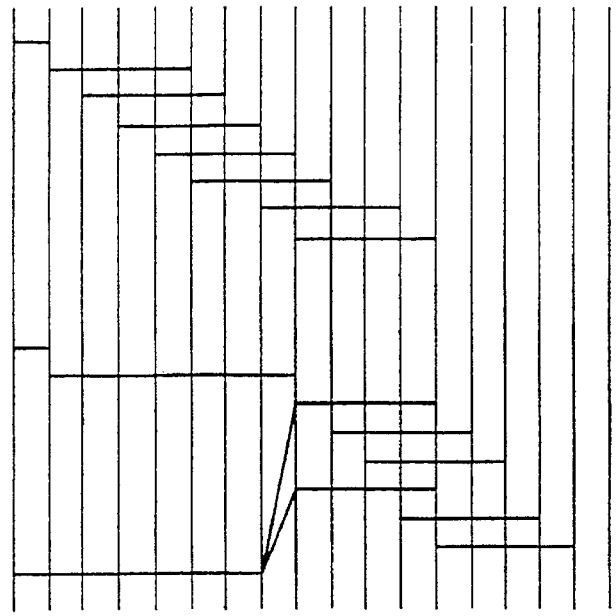

PRESENT INVENTION
LOAD

II {
(C) {
  START
  ADDRESS GENERATION
  ADDRESS TRANSLATION
  REQUEST
  PRIORITY
  MSU
  BUFFER WRITE
  REGISTER WRITE
}

STORE (D) {
  START
  ADDRESS GENERATION
  ADDRESS TRANSLATION
  REQUEST
  PRIORITY
  REGISTER READ
  BUFFER READ
  MSU
}

VE-STOP
}

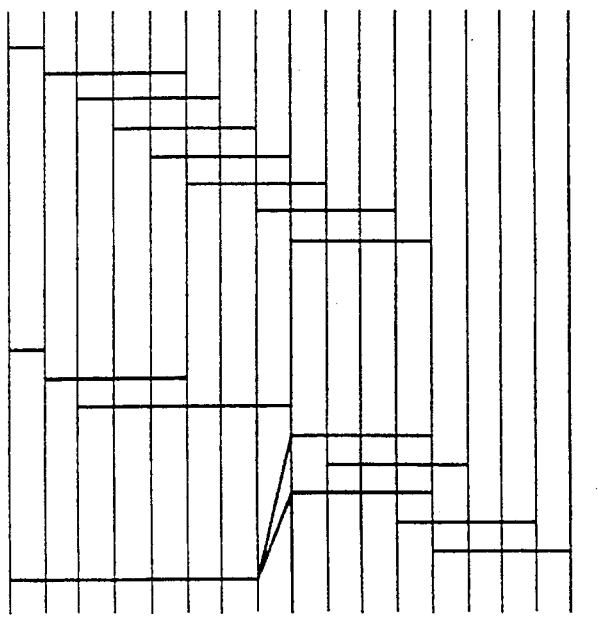

5,598,574

VECTOR PROCESSING DEVICE

This application is a continuation of application Ser. No. 08/115,321, filed Sep. 2, 1993, now abandoned.

BACKGROUND OF THE INVENTION

1. Field of the Invention

The present invention relates to a vector processing device that processes a large quantity of data by a single instruction.

2. Description of the Related Art

A vector processing device has a plurality of pipelines, and carries out a complex process by of the pipelines. Therefore a large quantity of data can be processed at a high speed. Normally, the vector processing device includes an instruction executing unit composed of a vector unit and a scaler unit, a main memory unit, and a memory control unit. The vector unit includes a vector register, and operation pipelines of addition, multiplication and division. Data to be operated on, that is, operation data is read from the main memory unit and is stored in a data buffer provided in the memory control unit. Thereafter, the operation data is read from the data buffer and is loaded to the vector register. The operation data is operated on by the operation pipelines in accordance with a vector instruction. The result of the operation is transferred from the vector unit, and is stored in the data buffer in the memory control unit. Thereafter, the operation result is stored in the main memory unit.

Recently, the vector processing device have employed a chaining process for vector registers in to process data at a high speed. The chaining of vector registers is such that, when a vector register, in which the operation result of a preceding vector instruction is stored, is referenced to by a subsequent vector instruction, execution of the subsequent vector instruction is started before the preceding instruction writes all data into the vector register.

The chaining of vector registers involves a major problem to be solved. That is, when the preceding vector instruction is a load instruction, vector data is not supplied to the operation pipelines executing the subsequent vector instruction each cycle due to a collision that occurs when accessing the main memory unit. In this case, the process cannot be correctly performed. To avoid the above situation, it is necessary to stop temporarily from operating the operation pipelines executing the subsequent vector instruction and a data transfer pipeline. Hence the reading of data from the vector registers is interrupted. The present invention was made with the above background in mind.

SUMMARY OF THE INVENTION

It is an object of the present invention to provide a vector processing device in which data buffers are efficiently used and a data transfer pipeline (particularly, a store pipeline) does not have any disturbance when the operation of operation pipelines is temporarily stopped while a vector instruction is being executed in the chaining state of vector registers.

This object of the present invention is achieved by a vector processing device comprising a vector unit, a memory unit, a memory control unit, a first unit, and a second unit. The vector unit has operation pipelines and a vector register connected to the operation pipelines. The memory unit is operated by the operation pipelines and results of operations obtained from the operation pipelines. The memory control unit has a data buffer provided between the vector register and the memory unit. The first unit counts the number of pieces of data read from the vector register and sent to the data buffer. The second means selectively interrupts outputting an access request from the vector unit to the memory unit on the basis of the number of pieces of data counted by the first unit when the operation pipelines are chained via the vector register.

BRIEF DESCRIPTION OF THE DRAWINGS

Other objects, features and advantages of the present invention will become more apparent from the following detailed description when read in conjunction with the accompanying drawings, in which:

FIG. 13 is a timing chart of the operation in the related art and the operation of the embodiment of the present invention.

DESCRIPTION OF THE PREFERRED EMBODIMENTS

Figure 1:
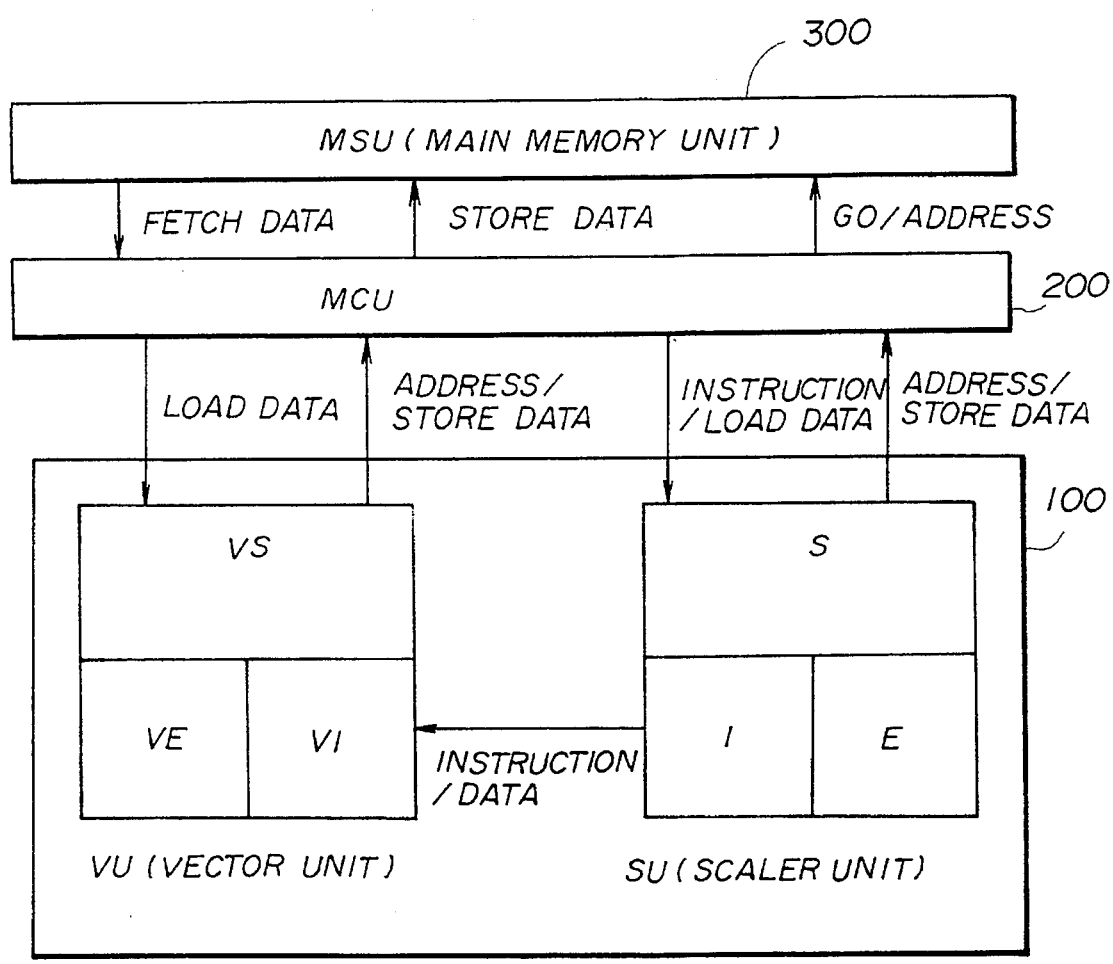
FIG. 1 is a block diagram of the overall structure of a vector processing device.

FIG. 1 is a block diagram of the structure of a vector processing device. The vector processing device shown in FIG. 1 includes an instruction executing unit 100, a memory control unit (MCU) 200, and a main memory (storage) unit (MSU) 300. The operation executing unit 100 includes a vector unit VU and a scaler unit SU. The vector unit VU performs an operation consisting of a plurality of elements by an instruction. The scaler unit SU performs an operation consisting of a single element by an instruction. The vector unit VU includes a vector instruction execution control part VI, an operation pipeline part VE, and an access pipeline part VS. Similarly, the scaler unit SU includes a scaler instruction execution control part I, a scaler operation part E, and an access part S.

Address and store data (data to be stored) from the scaler unit SU are transmitted to the main memory unit 300 via the memory control unit 200. Instructions and load data (data to be loaded) are transmitted to the scaler unit SU via the memory control unit 200. Similarly, address and store data from the vector unit VU are transmitted to the main memory unit 300 via the memory control unit 200, and load data from the main memory unit 300 is to transmitted the vector unit VU via the memory control unit 200.

Figure 2:
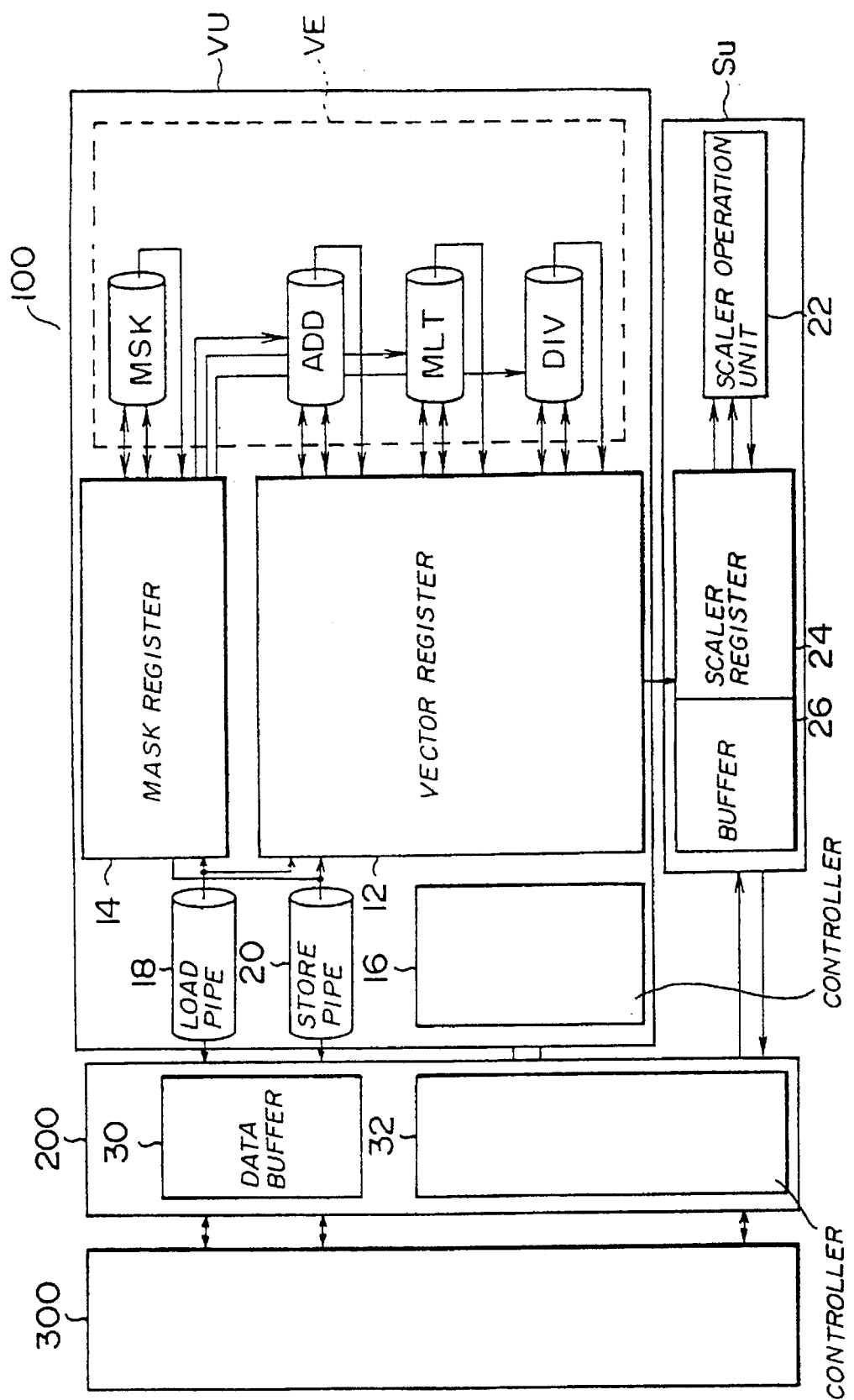
FIG. 2 is a block diagram of the details of the vector processing device shown in FIG. 1.

FIG. 2 is a block diagram of the details of the vector processing device shown in FIG. 1. The access pipeline part VS of the vector unit VU includes a vector register 12, a mask register 14, a controller 16 and data transfer pipelines 18 and 20. The operation pipeline part VE includes add/logic operation pipeline ADD, a multiplication pipeline MLT, a division pipeline DIV, and a mask pipeline MSK. The vector instruction execution control part VI shown in FIG. 1 is not shown in FIG. 2 for simplicity. The scaler operation unit E of the scaler unit SU includes a scaler operation unit 22. The access part S includes a scaler register 24 and a buffer 26. The scaler instruction execution control part I shown in FIG. 1 is omitted for simplicity. The memory control unit 200 includes a data buffer 30 and a controller 32.

The vector processing device shown in FIG. 2 operates as follows. By way of example, execution of a vector addition instruction is now be described. The vector addition instruction VADD is executed as follows:

```
VLOAD      VR1
VLOAD      VR2
VADD       VR1, VR2, VR3
VSTORE     VR3.
```

Figure 3:
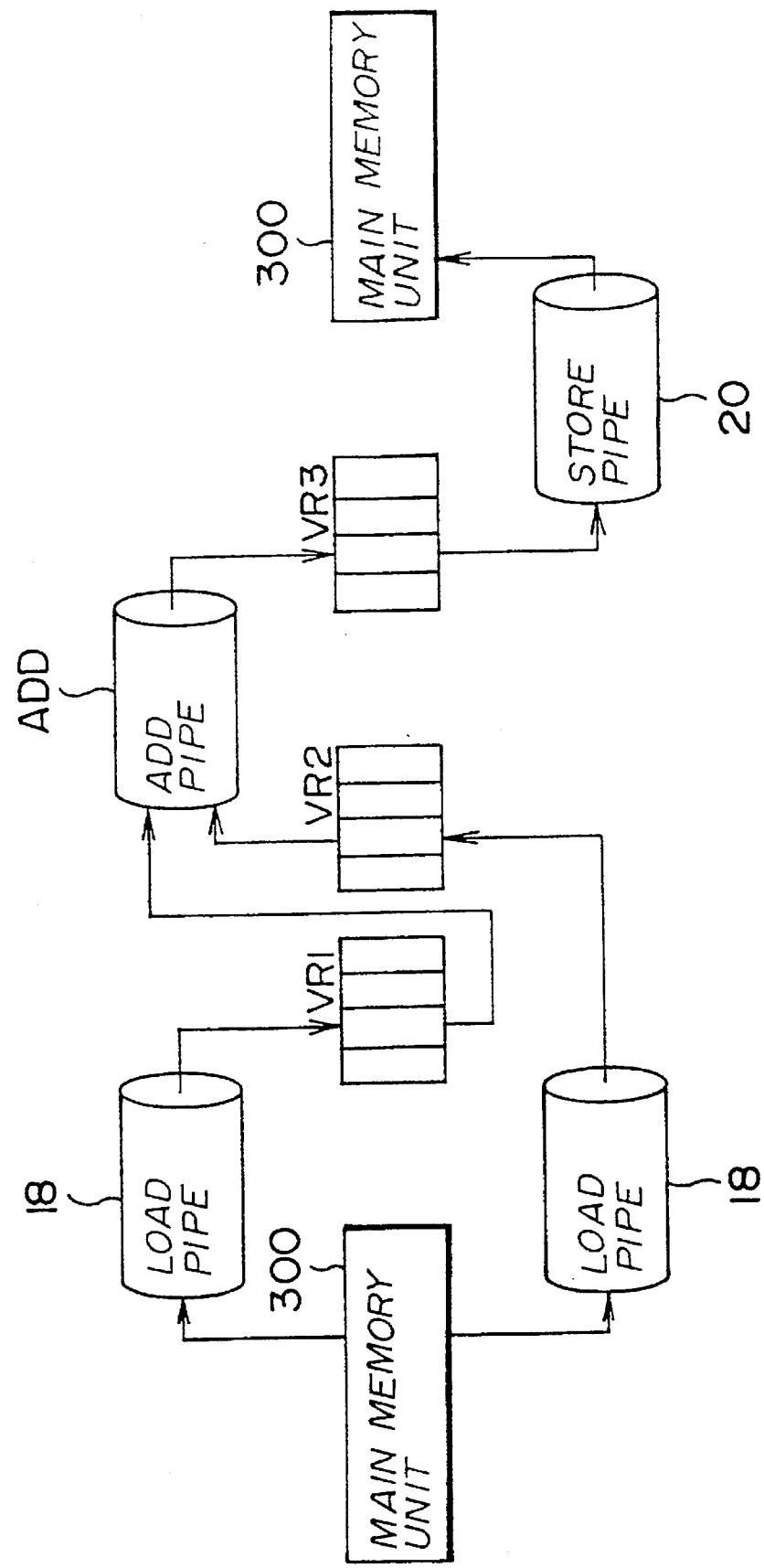
FIG. 3 is a diagram showing a chain of vector registers.

At the commencement of execution of the vector addition instruction, the first vector load instruction VLOAD is executed. Accordingly, data is loaded from the main memory unit 300 into a register VR1 formed in the vector register 12 via the data buffer 30 of the memory control unit 200 and the load pipeline 18 of the vector unit VU. Next, the second vector load instruction VLOAD is executed. Accordingly, data is loaded from the main memory unit 300 to a register VR2 in the vector register 12 via the same route. Then, using the addition/logic pipeline ADD, the vector addition instruction VADD is executed. Accordingly, the data stored in the register VR1 and the data stored in the register VR2 are added. The result of the addition operation is stored in a register VR3 formed in the vector register 12. Finally, the vector store instruction VSTORE is executed. Accordingly, the operation result stored in the register VR3 is stored in the main memory unit 300 via the store pipeline 20 and the data buffer 30. FIG. 3 illustrates execution of the above vector addition instruction.

As described previously, the vector processing device employs the chaining of vector registers to improve the operation speed. In the example shown in FIG. 3, execution of the vector addition instruction VADD is started before all data is written into the vector register by execution of the vector load instruction VLOAD that precedes the vector addition instruction VADD. In this case, when the preceding vector load instruction collides with another vector load instruction during accessing of the main memory unit 300, vector data may not be supplied to the addition/logic pipeline. This prevents the normal execution of the vector operation.

The above problem may be eliminated by stopping the supplying of a clock signal used to read data from the vector register 12, so that the reading of data is interrupted. The stopping of supplying the clock signal does not greatly affect the operation pipeline part VE.

However, stopping the supplying of the clock signal causes the following problem with respect to the data transfer pipelines 18 and 20. Normally, a condition for the store pipelines is determined in which a data buffer 30 is provided between the main memory unit 300 and the vector register 12. Therefore, vector data can be definitely read and sent to the data buffer 30 during a predetermined number of machine cycles. The predetermined number of machine cycles corresponds to the time necessary to send data to the main memory unit 300 after the priority order of execution in the controller 32 of the memory control unit 200 is determined.

Under the above condition, data cannot be written into the data buffer 30 if the clock signal used to read data from the vector buffer 12 is stopped in a case in which data to be stored is read from the vector register 12 and transmitted to the data buffer 30 at the same time as the controller 16 of the vector unit VU sends an access request to the main memory unit 300 and in which the data stored in the data buffer 30 is read in response to receipt of a write enable signal. Hence, it is not possible to ensure such an operation in which data regarding an access request that has been sent or an access request that has been assigned the priority order can be stored in the data buffer 30 within the predetermined number of machine cycles. In this case, the stored data will become different from the original data.

Alternatively, it may be possible to stop accessing from the vector unit VU to the memory control unit 200 in order to interrupt the reading of data from the store pipeline.

Figure 4:
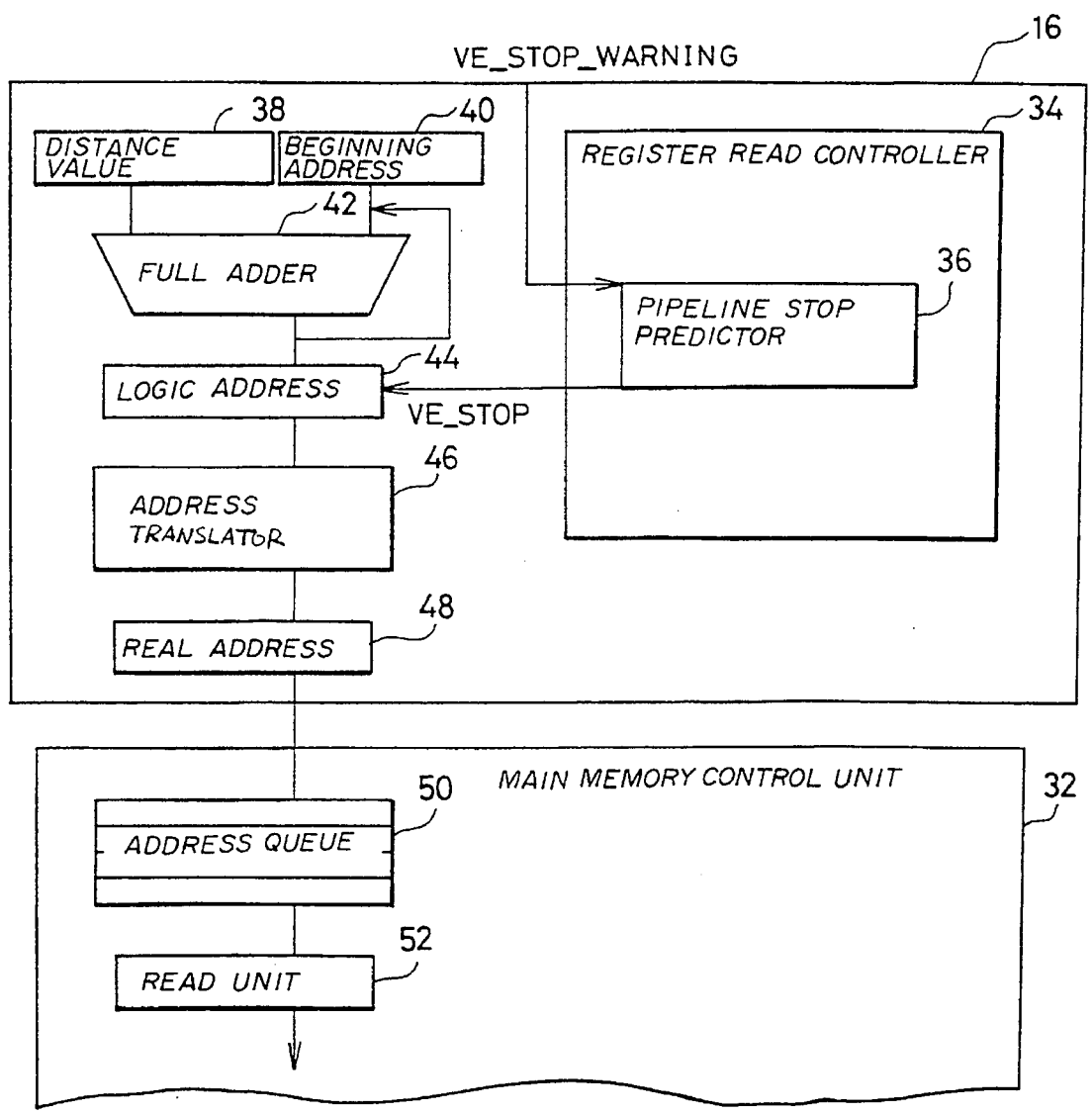
FIG. 4 is a block diagram of essential parts of the structure shown in FIG. 2.

FIG. 4 is a diagram of the structure of the controller 16 of the vector unit VU shown in FIG. 2 relating to an access request (address generation of the main memory unit 300). A register read controller 34 controls the read operations of the vector register 12 and the mask register 14. The register read controller 34 includes a pipeline stop predictor 36 provided therein. When the pipeline stop predictor 36 receives an operation pipeline stop alarm warning signal VE-STOP-WARNING from the vector instruction execution control part VI, the pipeline, stop predictor 36 decides that it is necessary to interrupt the reading of data from the vector register 12, and immediately generates an access request stop signal VE-STOP. The operation pipeline stop warning signal VE-STOP-WARNING indicates that a situation necessary to stop the operation of the operation pipelines due to a drain on data in the chaining state of vector registers and that it is necessary to stop storing data.

The address generation is carried out by distance value register 38, a beginning address 40, a full adder 42, a logical address register 44, an address translator 46, and a real address register 48. The beginning address of the main memory unit 300 and the distance value (information indicating the position of data which is placed in bytes corresponding to the distance value) are written, as start signals, into the registers 40 and 38, respectively. The full adder 42 derives a logical address from the addresses written into the registers 38 and 40, and writes the logical address into a register 44. The logical address is translated into a real address of the main memory unit 300 by the address translator 46, which is then written into a register 48.

The real address written into the register 48 is queued in an address queue buffer 50 in the controller 32 of the main memory unit 200. The controller 32 performs a request priority order determining process with respect to the queued real address, and selects one real address via a read unit 52.

The aforementioned address request stop signal VE-STOP is applied to the logical address register 44, and stops the operation of the register 44. Thus, the logical address cannot be applied to the address translator 46. Accordingly, the real address cannot be supplied to the address queue register 50. The pipeline stop predictor 36 stops outputting the access request stop signal VE-STOP, for example, when a predetermined time elapses after receiving the operation pipeline stop warning signal VE-STOP-WARNING.

However, the structure shown in FIG. 4 interrupts a data transfer by an access request which is generated after the access request stop signal VE-STOP and is not necessary to stop execution of the data transfer. As a result, a wasteful empty area is formed in the data buffer 30, and the operation of the store pipeline is disturbed.

The present invention eliminate the above-mentioned disadvantages.

Figure 5:
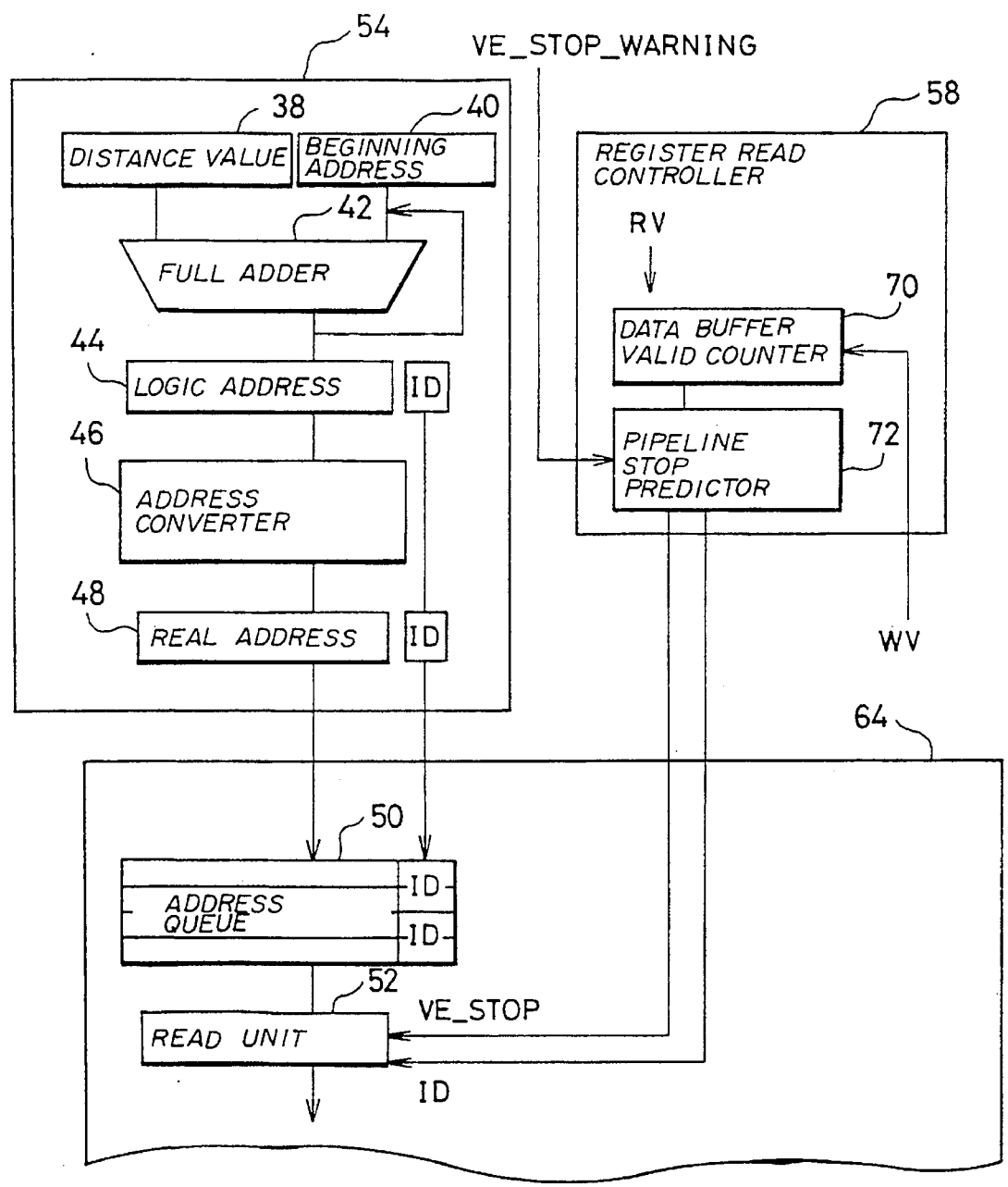
FIG. 5 is a block diagram of the principle of the present invention.

FIG. 5 is a block diagram of the principle of the present invention. FIG. 5 shows an essential part of the vector processing device shown in FIG. 6, which will be described in detail later. In order to eliminate the above disadvantages, the vector processing device of the present invention includes a vector unit, a memory unit, a memory control unit, a data buffer valid counter, and a pipeline stop predictor. The vector unit, which is shown as element 100A in FIG. 6, has a plurality of pipelines and a vector register 12 (FIG. 6) connected to the pipelines. The memory unit which is shown as element 300 in FIG. 6, has storing data to be operated on by the pipelines and the results of operations. The memory control unit which is shown as element 200A in FIG. 6, has a data buffer 30 (FIG. 6) provided in the vector register and the memory unit. The data buffer valid counter, which is shown as element 70 in FIG. 5 counts the number of items of data read from the vector register and transmitted to the data buffer. The pipeline stop predictor, which is shown as element 72 in FIG. 5 selectively interrupts, in a state in which the operation pipelines are chained via the vector register, an access request from the vector unit to the memory unit on the basis of the number of items of data counted by the data buffer valid counter 70.

In the configuration which has been described with reference to FIG. 4, the transmission of all access requests is stopped when a drain of data in the operation pipelines in the chaining state occurs. On the other hand, according to the present invention, it becomes possible to interrupt only a minimum number of necessary access requests by selectively interrupting, by pipeline stop predictor, the transmission of access requests from the vector unit to the memory unit on the basis of the number of pieces of data counted by the data buffer valid counter 70 in the state in which the operation pipelines are chained via the vector register.

Figure 6:
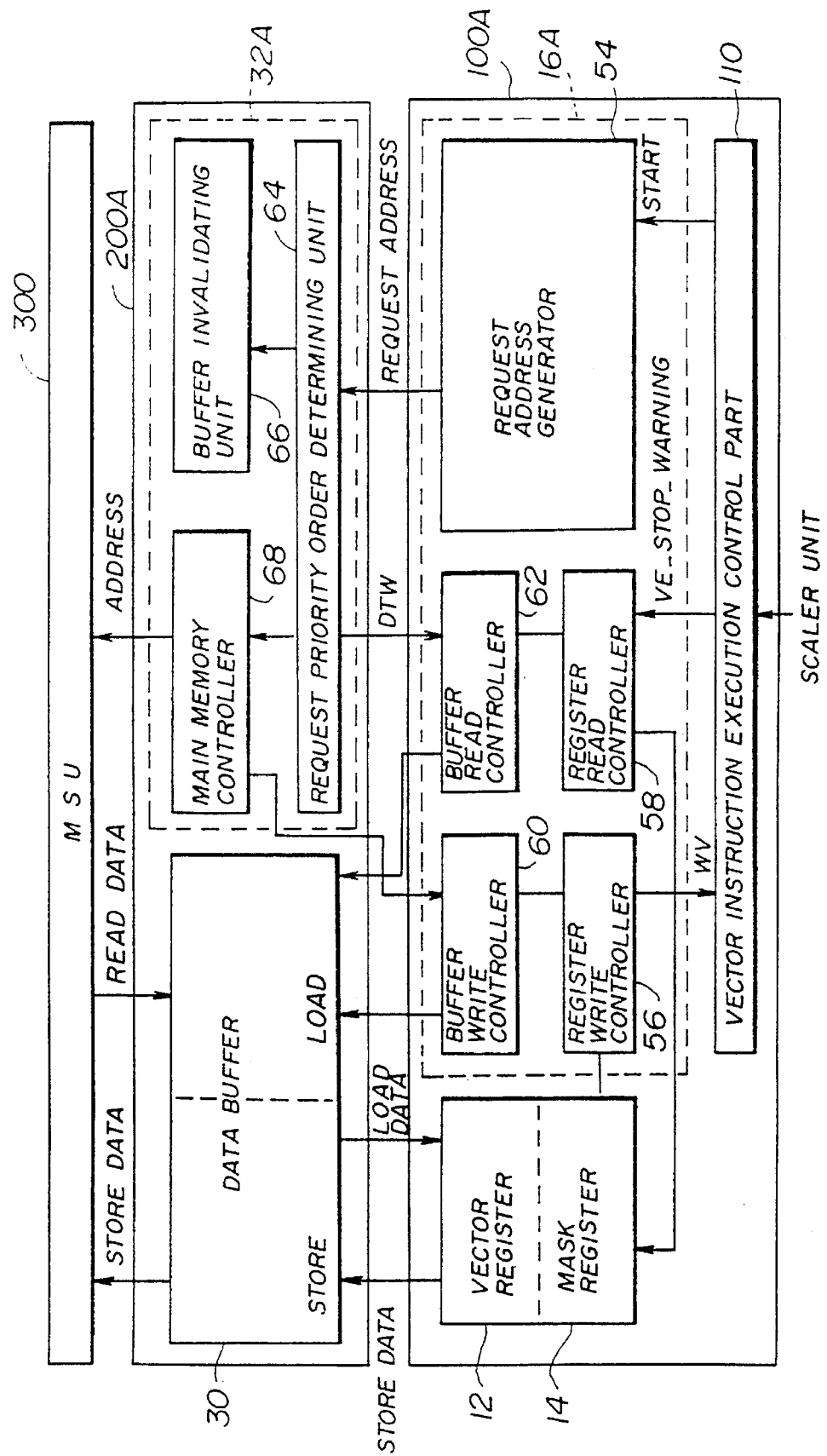
FIG. 6 is a block diagram of an embodiment of the present invention.

FIG. 6 is a block diagram of a vector processing device according to an embodiment of the present invention. In FIG. 6, elements that are the same as elements shown in FIG. 2 are given the same reference numbers. The vector processing device shown in FIG. 6 includes the vector unit 100A, the memory control unit 200A, the main memory unit 300 and a scaler unit. For simplicity, the scaler unit is omitted from FIG. 6.

The vector unit 100A includes a vector instruction execution control part 110, a controller 16A, the vector register 12, the mask register 14 and operation pipelines. For simplicity, the operation pipelines are not shown in FIG. 6, but are connected to the vector register 12 and the mask register 14, as shown in FIG. 2. The vector instruction execution control part 110 is connected to the unshown scaler unit, and a transmits start signal START and the operation pipeline stop warning signal VE-STOP-WARNING to the controller 16A. Further, the vector instruction execution control part 110 receives a write valid signal WV from the controller 16A.

The controller 16A includes a request address generator 54, a register write controller 56, a register read controller 58, a buffer write controller 60, and a buffer read controller 62. These controllers are formed by, for example, respective microcomputers or a single microcomputer, and execute programs which will be described later.

FIG. 5, which has been previously described, indicates the respective essential elements of the request address generator 54, the register read controller 58, and a request priority order determining unit 64 which will be described later. The request address generator 54 includes the aforementioned distance value register 38, the beginning address register 40, the full adder 42, the logical address register 44, the address translator 46 and the real address register 48. The logical address in the logical address register 44 is assigned identification information ID identifying the logical address. The identification information ID is assigned to the address by the vector operation execution control part 110, and is also assigned to the real address translated from the logical address. The real address with the identification information ID added thereto is transferred to the address queue register 50.

As shown in FIG. 5, the register read controller 58 includes a data buffer valid counter 70, and a pipeline stop predictor 72. The counter 70 and the predictor 72 are formed by, for example, software carried out by the register read controller 58. As will be described later, the data buffer valid counter 70 counts the number of pieces of data read from the vector register 12 and sent to the data buffer 30 to interrupt the operation of the transfer pipeline used to store data with respect to only a minimum number of necessary access requests. The pipeline stop predictor 72 receives the operation pipeline stop warning signal VE-STOP-WARNING from the vector instruction execution control part 110, and transmits the access request stop signal VE-STOP to the request priority order determining unit 64 of the memory control unit 200A together with the identification information ID assigned to the vector instruction to be stopped.

The register write controller 56 controls the write operations of the vector register 12 and the mask register 14. The register read controller 58 controls the read operation of the vector register 12 and the mask register 14. The buffer write controller 60 controls the write operation of the data buffer 30 in the memory control unit 200A. The buffer read controller 62 controls the read control of the data buffer 30.

The controller 32A of the memory control unit 200A includes the request priority order determining unit 64, a buffer invalidating processor 66, and a main memory unit controller 68. As shown in FIG. 5, the request priority order determining unit 64 includes the address queue register 50 and the read unit 52, in addition to an element which executes a control which will be described later. The real address (access request) stored in the address queue register 50 is temporarily stored in the address queue register 50 until the request priority order is assigned thereto. When the read unit 52 receives the access request stop signal VE-STOP and the identification information ID, the read unit 52 reads, from among real addresses stored in the address queue register 50, only the real address to which different identification information ID has been assigned, and transmits the read real address to the main memory controller 68. Hence, only a minimum number of necessary access requests can be interrupted without interrupting access requests unnecessary to be interrupted.

The main memory controller 68 receives the access request (real address) from the request priority order determining unit 64, and outputs necessary signals including the real address to the main memory unit 300. The buffer invalidating processor 66 performs an invalidating process for the buffer 26 of the scaler unit shown in FIG. 2. The data buffer 30 is segmented into an area for the store operation and an area for the load operation.

The operation of the embodiment of the present invention shown in FIGS. 5 and 6 will now be described.

First, a description will be given of an outline of the operation carried out when a load instruction or a store instruction is executed. The scaler unit SU receives a vector instruction read from the main memory unit 300 via the data buffer 30, and transmits the received vector instruction to the vector instruction execution controlling part 110.

When the received vector instruction is a load instruction, the request address generator 54 generates an access request (the generation of the real address) in response to the start signal START of the vector instruction. On the basis of the access request to which the priority order is assigned by the request priority order determining unit 64, the main memory controller 68 transmits the address signal and a start signal (GO) to the main memory unit 300. At the same time, the main memory controller 68 sends a data output signal to the buffer write controller 60 in synchronism with a timing with which data read from the main memory unit 300. The buffer write controller 60 receives the above data output signal, and writes the data read from the main memory unit 300 into the data buffer 30. Then, the register write controller 56 writes the data written into the data buffer 30 into the vector register 12.

When the vector instruction received from the scaler unit SU is a store instruction, the register read controller 58 reads data from the vector register 12 at the same time as outputting the start signal START of the vector instruction, and writes the received data into the data buffer 30. The request priority order determining unit 64 assigns the priority order to the access request, and transmits the data transfer signal to the buffer read controller 62 and the buffer invalidating processor 66. When the access request is a read operation from the scaler unit SU, the buffer invalidating processor 66 registers the relevant address in a tag register (TAG) provided therein. When the access request is a vector store operation, the buffer invalidating processor 66 refers to the tag register, and performs the invalidating process for the buffer 26 (FIG. 2) of the scaler unit SU when the address has been registered in the tag register. In response to the data transfer signal, the buffer read controller 62 reads the stored data from the data buffer 30, and transmits the read data to the main memory unit 300. At the same time as the above, the main memory controller 68 of the memory control unit 200A sends the address and the start signal (GO) to the main memory unit 300.

A detailed description will now be given of the operation of the embodiment of the present invention.

Figure 7:
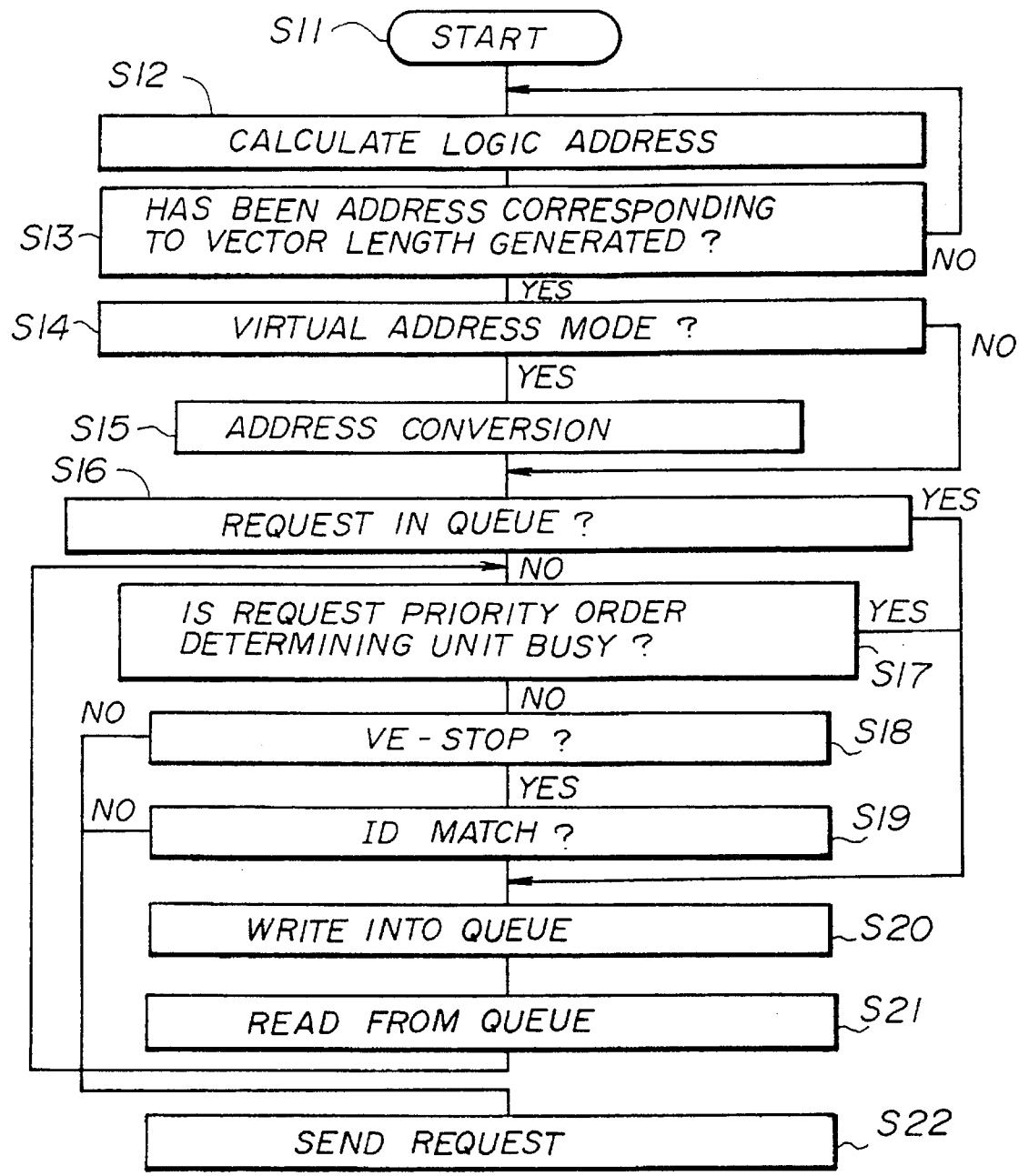
FIG. 7 is a flowchart of the operation of a request address generator shown in FIG. 6.

FIG. 7 is a flowchart of the operations of the request address generator 54 and the request priority order determining unit 64. The process is started in response to the start signal START from the scaler unit SU (step S11). Information indicating the beginning address of and distance value of the access request is received from the vector instruction execution control unit 110, and the logical address is calculated therefrom (step S12). When it is confirmed that the logical address corresponding to a vector length (step S13), the request address generator 54 determines whether or not a virtual address mode has been set (step S14). When it is determined that the virtual address mode has been set, the logical address is translated into the real address (step S15). Then, the request address generator 54 determines whether or not any read address is held in the address queue buffer 50 (step S16). When the virtual address mode has not been specified, step S16 is performed without step S15.

When it is determined, in step S16, that a real address (access request) has been registered in the address queue register 50, step S20 is performed. When not, the request address generator 54 determines whether the request priority order determining unit 64 is busy (step S17). This determination can be carried out by, for example, referring to the state of a busy signal line extending from the request priority order determining unit 64. When it is determined that the unit 64 is busy, step S20 is carried out. When it is determined, in step S17, that the unit 64 is not busy, the read unit 52 of the request priority order determining unit 64 determines whether the access request stop signal VE-STOP has been supplied (step S18). When the determination result of step S18 is NO, the access request (real address) is immediately sent to the main memory unit 300 via the request priority order determining unit 64 without writing the real address into the address queue register 50 (step S22).

When it is determined, in step S18, that the access request stop signal VE-STOP has been supplied, it is determined whether the identification information ID assigned to the real address from the request address generator 54 coincides with the identification information ID from the register read controller 58 (step S19). When the identification information ID from the request address generator 54 does not coincide with the identification information ID from the register read controller 58, the address and the start signal are immediately transmitted to the main memory unit 300 (step S22). When it is determined, in step S19, that the identification information ID from the request address generator 54 coincides with the identification information ID from the register read controller 58, the read address is written into the address queue buffer 50, and is held until the supplying of the access request stop signal VE-STOP is stopped. That is, step S22 is performed when the address queue register 50 is accessed in step S21, and the determination results of the steps S16 and S17 are NO, and when the determination result of step S18 is YES.

Figure 8:
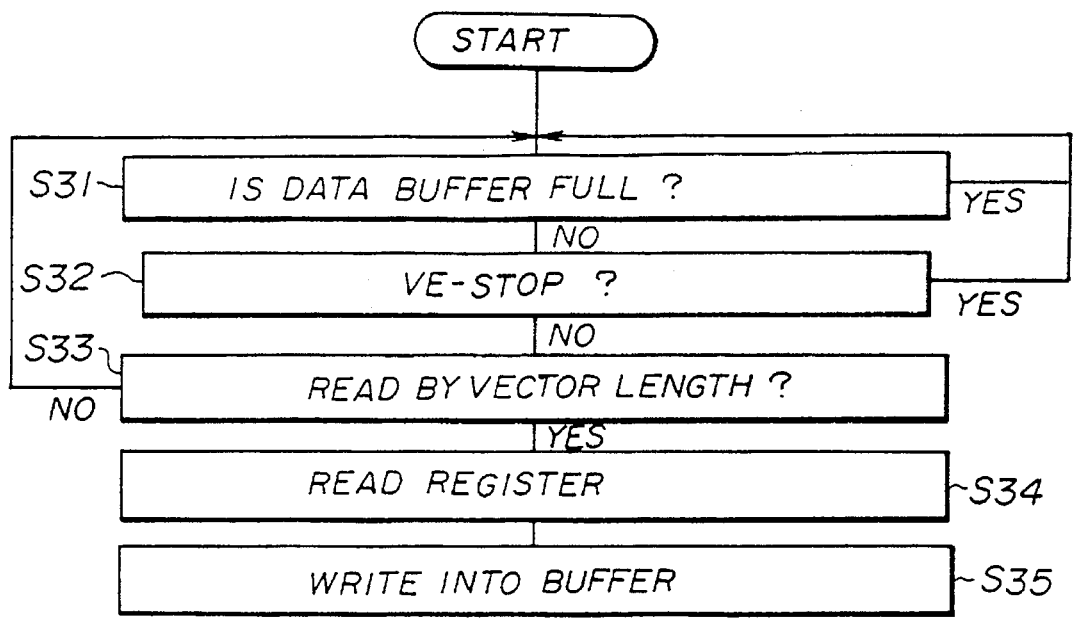
FIG. 8 is a flowchart of the operation of a register read controller shown in FIG. 6.

FIG. 8 is a flowchart of the operation of the register read controller 58. First, the register read controller 58 determines whether the data buffer 30 is full (step S31). When it is determined that the data buffer 30 is full, the register read controller 58 repeatedly performs step S31 until the determination result of step S31 becomes NO. When the determination result of step S31 becomes NO, the register read controller 58 determines whether the access request stop signal VE-STOP has been generated (step S32). When the result of this determination is YES, the process returns to step S31. When the result of step S32 is NO, the register read controller 58 determines whether or not data equal to the vector length has been read from the vector register 12 (step S33). When the result of this determination is NO, the process returns to step S31. When the determination result of step S33 is YES, the register read controller 58 reads the data from the vector register 12 (step S34), and writes the read data into the data buffer 30 (step S35).

Figure 9:
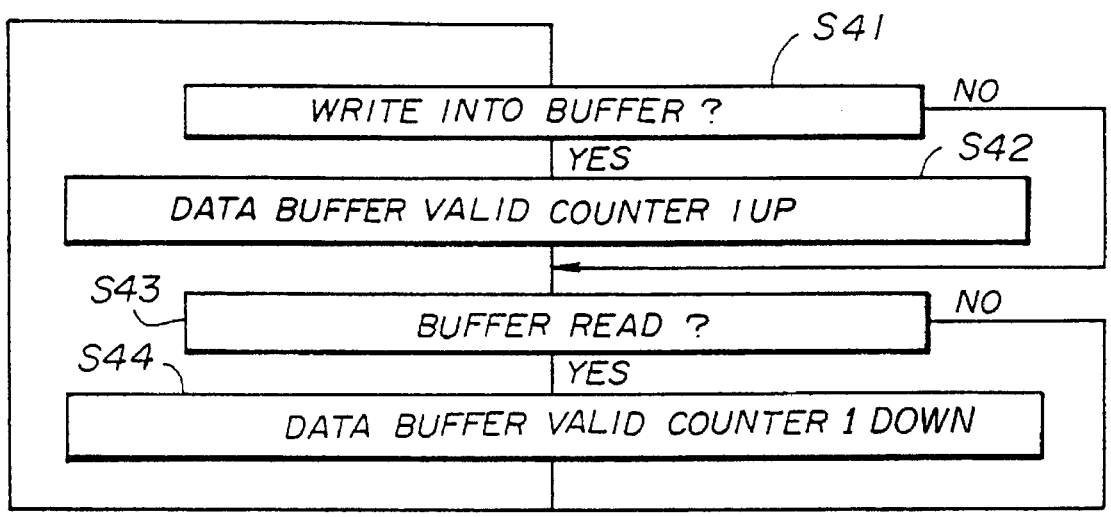
FIG. 9 is a flowchart of the operation of a data buffer valid counter shown in FIG. 6.

FIG. 9 is a flowchart of the operation of the data buffer valid counter 70 provided in the register read controller 58 shown in FIG. 5. The register read controller 58 determines, on the basis of the write valid signal WV generated when the write controller 56 writes data into the vector buffer 12, whether the writing of data into the vector buffer 12 has been carried out (step S41). When the result of this determination is YES, the register read controller 58 increments the count value of the data buffer valid counter 70 by 1 (step S42). The register read controller 58 determines, on the basis of a read valid signal RV generated when data is read from the vector buffer 12, whether the reading of data from the vector buffer 12 has been carried out (step S43). When the result of this determination is YES, the register read controller 58 decrements the count value of the data buffer valid counter 70 by 1 (step S44). Then, the process returns to step 41.

Figure 10:
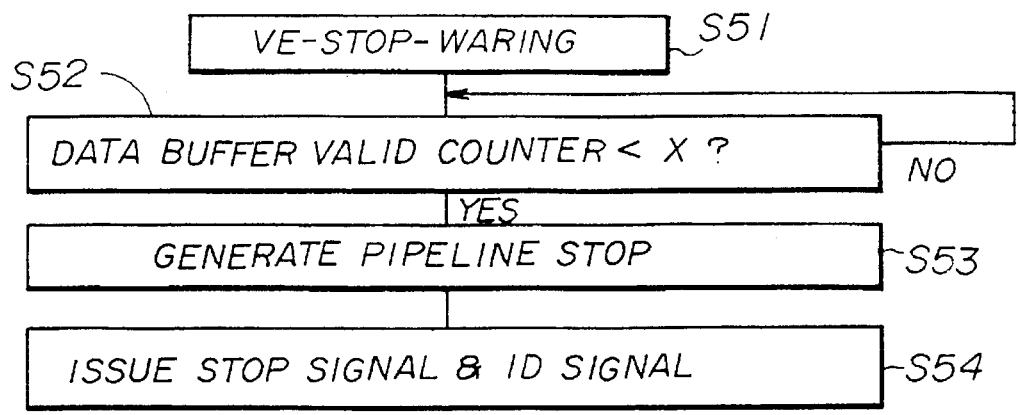
FIG. 10 is a flowchart of the operation of a pipeline stop control predictor shown in FIG. 6.

FIG. 10 is a flowchart of the operation of the pipeline stop predictor 72 provided in the register read controller 58 shown in FIG. 5. First, the operation pipeline stop warning signal VE-STOP-WARNING is received from the vector instruction execution control part 110 (FIG. 6) (step S51). In response to the signal VE-STOP-WARNING, the predictor 72 determines whether or not the counter value of the data buffer valid counter 70 (the number of pieces of data read from the vector register 70) is smaller than a predetermined value X (step S52). The predetermined value X corresponds to a predicted value of an allowable number of accesses (allowable quantity of data) even when the operation pipeline stop warning signal VE-STOP-WARNING indicating a drain of data in the operation pipeline VE is generated. If the counter value of the data buffer valid counter 70 becomes equal to or smaller than the predetermined value X, there is a possibility, due to acceptance of the access request, that a failure (a drain of data) may occur in execution of vector instructions in the chaining state of vector registers.

When it is determined, in step S52, that the counter value of the data buffer valid counter 70 is smaller that the predetermined value, it is concluded that the operation of the pipelines should be stopped (step S53), and the predictor 72 outputs the access request stop signal VE-STOP to the read unit 52 together with the identification information ID.

Figure 11:
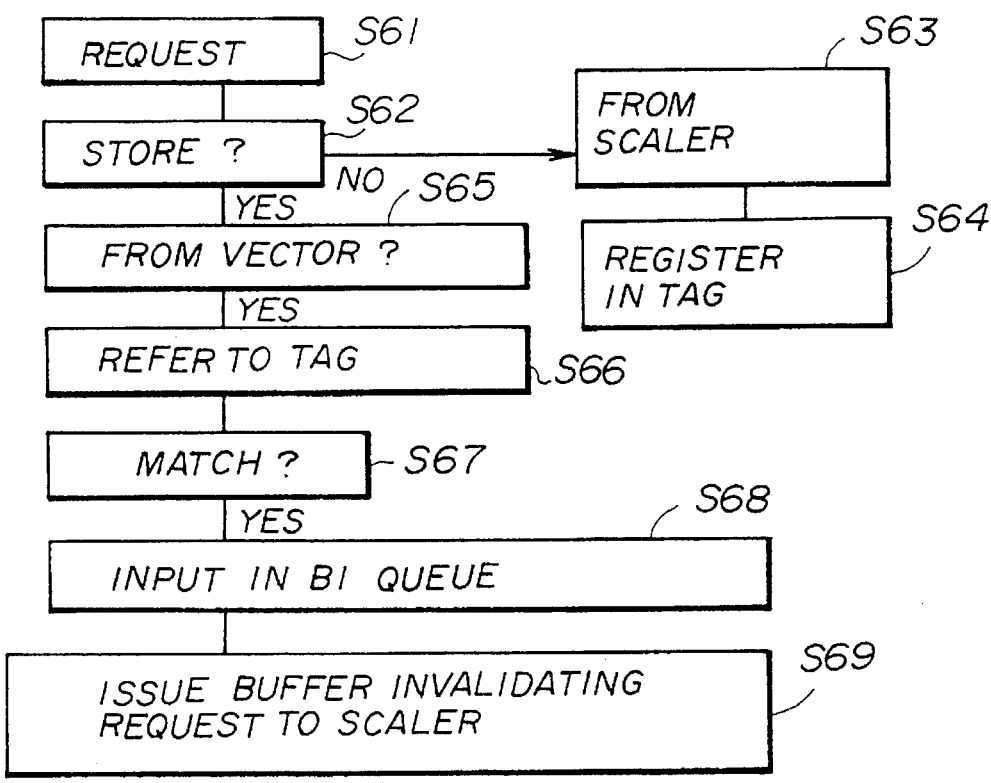
FIG. 11 is a flowchart of a buffer invalidating processor shown in FIG. 6.

FIG. 11 is a flowchart of the operation of the buffer invalidating processor 66. The buffer invalidating processor 66 receives the data transfer signal from the request priority order determining unit 64 (step S61), and determines whether the received data transfer signal is a store instruction (step S62). When the received signal is not a store instruction, the processor 66 determines whether the access request is a read from the scaler unit SU (step S63). When the access request is from the scaler unit SU, the buffer invalidating processor 66 registers the address of the access request in the tag register (TAG) provided therein (step S64). Further, the buffer invalidating processor 66 determines whether the access request is a store instruction from the vector unit 100A (step S65). If the determination result of step S65 is YES, the processor 66 refers to the tag register (step S66). When the access request has been registered in the tag register (step S67), the processor 66 stores the access request in the queue register provided therein (step S68), and then carries out the invalidating process for the buffer 26 (shown in FIG. 2) (step S69).

When the results of the determinations of steps S65 and S67 are NO, no process is carried out. That is, when the access is not an access from the vector (that is a store access from the scaler), or when the access is an access from the vector but its address has not be registered in the TAG, the scaler cache invalidating process is not carried out.

Figure 12:
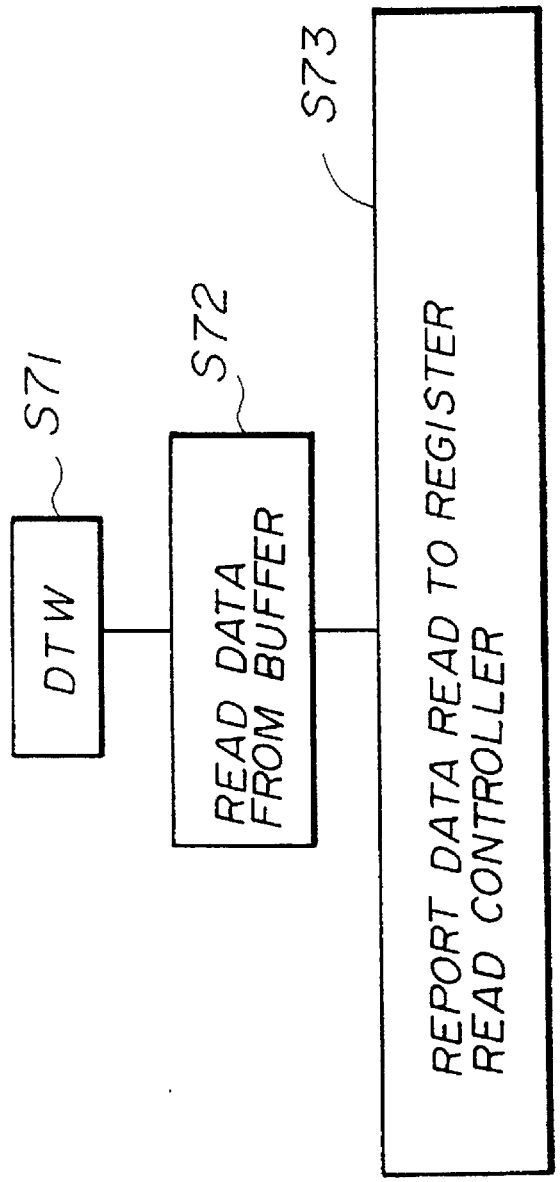
FIG. 12 is a flowchart of the operation of a buffer read controller shown in FIG. 6.

FIG. 12 is a flowchart of the operation of the buffer read controller 62. The buffer read controller 62 receives a warning signal DTW (Data Transfer Warning) indicating a drain of data from the request priority order determining unit 64 (step 71). Then, the buffer read controller 62 reads data from the data buffer 30 (step S72), and reports the reading of data to the register read controller 58 (step S73).

FIG. 13 is a timing chart of the operation of the embodiment of the present invention. Part I of FIG. 13 shows the conventional access control operation, and part II thereof shows the access control operation according to the embodiment of the present invention. Part (A) in part I of FIG. 13 and part (C) in part II thereof show the operation timings of the load instruction, and part (B) in part I of FIG. 13 and part (D) in part II thereof show the operation timing of the store instruction. The operation timing of the load instruction in the prior art is the same as that of the load instruction according to the embodiment of the present invention.

In the conventional execution of the store instruction, as shown in part (B) in part I of FIG. 13, the address translation is not performed while the access request stop signal VE-STOP is active. As described previously with reference to FIG. 4, the access request stop signal VE-STOP is output to the logical address register 44, and the output of the logic address to the address translator 46 is inhibited. When the access request stop signal VE-STOP is turned OFF, the address translating operation is started.

According to the embodiment of the present invention, as shown in part (D) in part II of FIG. 13, the access translating operation is being carried out while the access request stop signal VE-STOP is ON. As described, only a minimum number of necessary access requests are interrupted. Accordingly, the address translating operation continues to be carried out. When the access request signal VE-STOP is turned OFF, the priority order is given to the access requests.

Figure 14:
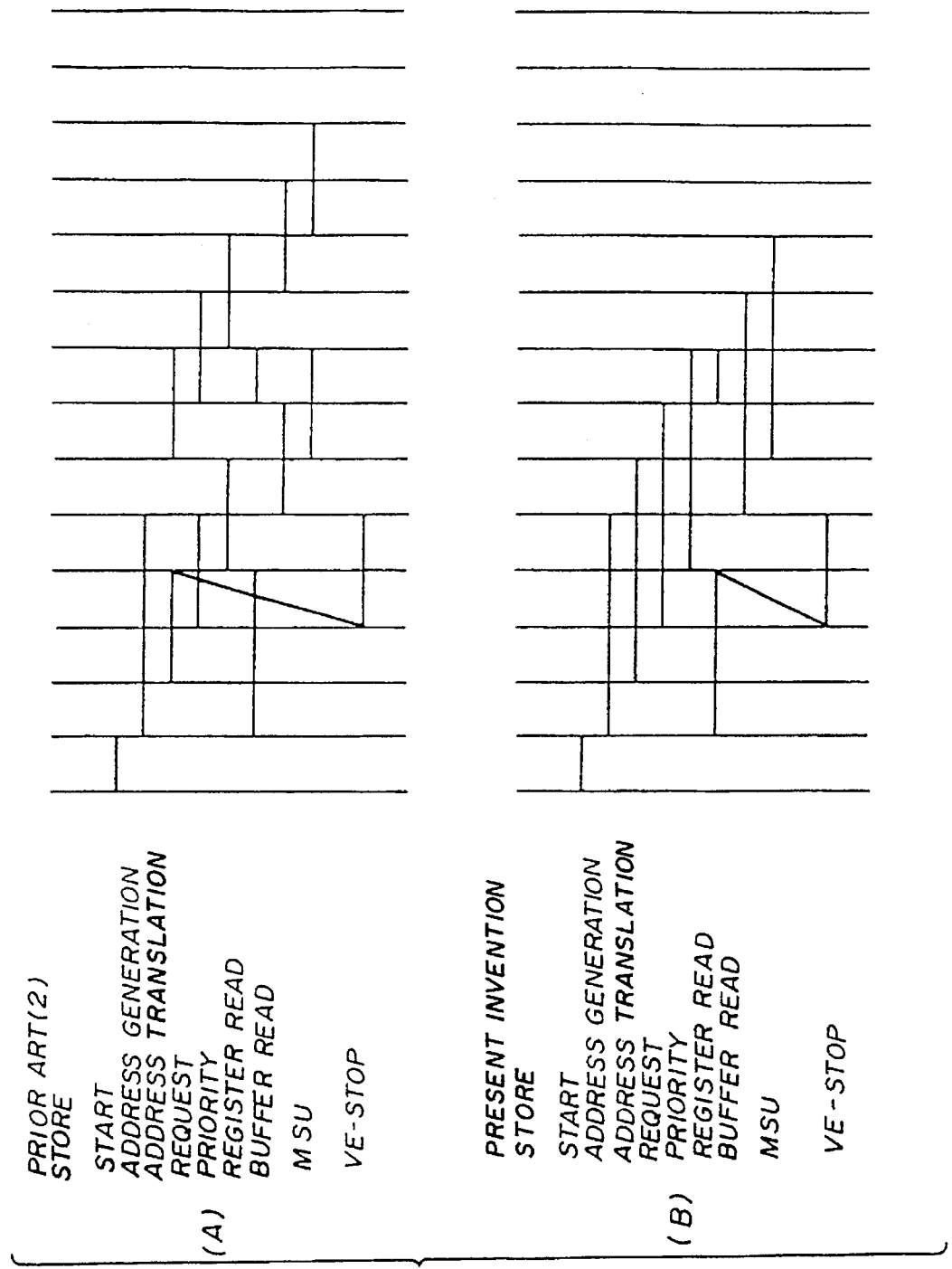
FIG. 14 is a timing chart of the operation of the embodiment of the present invention.

FIG. 14 is a diagram showing another executing timing of the store instruction. Part (A) of FIG. 14 shows the conventional operation timing of the store instruction, and a part (B) thereof shows the operation timing of the store instruction according to the embodiment of the present invention. In the conventional control, when the access request stop signal VE-STOP is turned ON during the address translating operation, the address translating operation is immediately stopped. The preceding instruction which has been assigned the priority order continues to be executed, and data is read from the data buffer 30 and stored in the main memory unit 300. When the access request stop signal VE-STOP is turned OFF, the address translating operation is started again.

According to the embodiment of the present invention, the address translating operation is not interrupted even when the access request signal VE-STOP is turned ON.

When the operation must be selectively carried out, the mask register 14 is used to extend the application of the pipeline process by providing the result of a decision on the selection as a mask pattern of a bit sequence. However, the mask register 14 is not directly used in the control by the embodiment of the present invention. Accordingly, the details of the operation of the mask register 14 are omitted.

According to the present invention, the following advantages are obtained.

First, with the data buffer valid counter, it becomes possible to interrupt only a minimum number of necessary access requests by referring to the state of the data buffer when the pipelines are in the state in which the operation thereof should be stopped. Hence, it becomes possible to efficiently use the pipelines having the data buffer.

Second, it becomes possible to certainly identify the vector instruction whose address request should be stopped by assigning the identification information ID to each vector instruction and comparing it with identification information of a vector instruction requested to be stopped.

Third, it becomes possible to apply the above-mentioned control to a vector processing device operating under a condition in which the throughput of address generation does not correspond to the throughput of reading of data from the vector register. Conventionally, in such a condition, the operation of the pipelines is stopped.

The present invention is not limited to the specifically disclosed embodiments, and variations and modifications may be made without departing from the scope of the present invention.

What is claimed is:

1. A vector processing device comprising:

a vector unit outputting access requests, each access request comprising a vector instruction, said vector instruction comprising an instruction identifier, said vector unit comprising:
   operation pipelines, and
   a vector register connected to the operation pipelines;

a memory control unit coupled to the vector register and comprising a data buffer;

a memory unit, coupled to the data buffer and accessed by the operation pipelines, storing results of operations obtained from the operation pipelines;

first means for counting for each vector instruction a number of pieces of data read from the vector register and transmitted to the data buffer; and second means for selectively interrupting the access requests output from the vector unit to the memory unit based on the number of pieces of data counted by the first means and on a value of the instruction identifier, if the operation pipelines are chained via the vector register; and wherein the vector processing device further comprises:

a vector controller coupled to the second means and outputting the vector identifier;

third means, provided in said second means, for outputting address information and the instruction identifier to the memory unit received from the vector controller;

fourth means, provided in the memory control unit, for temporarily storing said address information and said instruction identifier; and fifth means for selectively interrupting the access request by referring to said instruction identifier stored in the fourth means and for selecting the address information concerning an instruction in a register chained state.

2. The vector processing device as claimed in claim 1, wherein the first means comprises count means for counting the number of pieces of data based on first number of times that data in the data buffer is written into the memory unit and a second number of times that data in the vector register is read into the data buffer.

3. The vector processing device as claimed in claim 1, wherein said second means comprises third means for selectively interrupting one of the access requests in response to a signal indicating a drain of data supplied to one of the operation pipelines chained to the vector register.

4. The vector processing device as claimed in claim 2, wherein said second means selectively interrupts the access request based on a difference between the first number of times and the second number of times.

* * * * *

UNITED STATES PATENT AND TRADEMARK OFFICE
CERTIFICATE OF CORRECTION

PATENT NO. : 5,598,574
DATED : January 28, 1997
INVENTOR(S) : Toru YOSHINAGA et al.

It is certified that error appears in the above-indentified patent and that said Letters Patent is hereby corrected as shown below:

```
Title page, Item 56, line 9, change "11/1996" to
            --4/1996--;
Item 57,    line 8, after "includes" insert --a--; and
            line 11, after "and" insert --a--.
Col. 1,     line 14, delete "of";
            line 15, change "Therefore" to --Therefore,--;
            line 31, change "device" to --devices--;
            line 32, delete "in"; and
            line 35, delete "to".
Col. 3,     line 4, change "to transmitted the" to
            --transmitted to the--; and
            line 21, delete "be".
Col. 4,     line 37, after "pipeline" delete "," (comma); and
            line 46, after "by" insert --a--.
Col. 5,     line 13, change "eliminate" to --eliminates--;
            line 43, after "by" insert --the--;
            line 63, delete "a"; and
            line 64, after "transmits" insert --a--.
Col. 7,     line 65, delete "or not".
```

UNITED STATES PATENT AND TRADEMARK OFFICE
CERTIFICATE OF CORRECTION

PATENT NO. : 5,598,574
DATED : January 28, 1997
INVENTOR(S) : Toru YOSHINAGA et al.

It is certified that error appears in the above-indentified patent and that said Letters Patent is hereby corrected as shown below:

Col. 8, line 54, delete "or not".
Col. 9, line 42, after "is" insert --a read--.
Col. 10, line 31, delete "a".
Col. 12, claim 2, line 17, after "on" insert --a--.

Signed and Sealed this

First Day of July, 1997

Attest:

BRUCE LEHMAN

Attesting Officer        Commissioner of Patents and Trademarks